United States Patent
Liu et al.

(10) Patent No.: US 11,502,810 B2
(45) Date of Patent: Nov. 15, 2022

(54) METHODS AND DEVICES FOR PDCCH MONITORING

(71) Applicant: Telefonaktiebolaget LM Ericsson (publ), Stockholm (SE)

(72) Inventors: Jinhua Liu, Beijing (CN); Rui Fan, Beijing (CN)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 88 days.

(21) Appl. No.: 16/982,829

(22) PCT Filed: Mar. 21, 2019

(86) PCT No.: PCT/CN2019/079056
§ 371 (c)(1),
(2) Date: Sep. 21, 2020

(87) PCT Pub. No.: WO2019/179498
PCT Pub. Date: Sep. 26, 2019

(65) Prior Publication Data
US 2021/0058217 A1    Feb. 25, 2021

Related U.S. Application Data

(63) Continuation of application No. PCT/CN2018/080268, filed on Mar. 23, 2018.

(51) Int. Cl.
*H04L 5/00*       (2006.01)
*H04L 1/00*       (2006.01)

(52) U.S. Cl.
CPC .......... *H04L 5/0094* (2013.01); *H04L 1/0038* (2013.01); *H04L 5/0007* (2013.01)

(58) Field of Classification Search
CPC ... H04L 5/0094; H04L 1/0038; H04L 5/0007; H04L 5/0053; H04W 24/10; H04W 48/16; H04W 48/12
See application file for complete search history.

(56) References Cited

U.S. PATENT DOCUMENTS 10,791,516 B1 *   9/2020   Chu .................. H04W 72/0446
11,405,161 B2 *   8/2022   Ahn ..................... H04W 74/00
(Continued)

FOREIGN PATENT DOCUMENTS

WO    2016164099 A1    10/2016
WO    2017026971 A1    2/2017
(Continued)

OTHER PUBLICATIONS

EPO Communication and Search Report dated Dec. 6, 2021 for Patent Application No. 19770539.5, consisting of 13-pages.
(Continued)

*Primary Examiner* — Hoang-Chuong Q Vu
(74) *Attorney, Agent, or Firm* — Christopher & Weisberg, P.A.

(57) ABSTRACT

The present disclosure provides a method in a network device for configuration of Physical Downlink Control Channel, PDCCH, monitoring by a terminal device. The method includes: determining a PDCCH monitoring configuration indicating a PDCCH resource pool to be monitored by the terminal device at an aggregation level; and transmitting the PDCCH monitoring configuration to the terminal device.

14 Claims, 8 Drawing Sheets

(56) References Cited

U.S. PATENT DOCUMENTS

| | | | |
|---|---|---|---|
| 2011/0268046 | A1 | 11/2011 | Choi et al. |
| 2013/0114419 | A1* | 5/2013 | Chen .................... H04L 5/0053 370/312 |
| 2013/0194931 | A1* | 8/2013 | Lee ...................... H04W 72/04 370/329 |
| 2016/0316462 | A1 | 10/2016 | Kim et al. |
| 2017/0295601 | A1* | 10/2017 | Kim ..................... H04L 5/0092 |
| 2018/0176929 | A1* | 6/2018 | Ryu ..................... H04L 5/0094 |
| 2018/0287761 | A1 | 10/2018 | You et al. |
| 2018/0310283 | A1* | 10/2018 | Deenoo ............. H04W 72/042 |
| 2019/0289478 | A1* | 9/2019 | Hosseini .............. H04L 1/1812 |
| 2020/0007259 | A1* | 1/2020 | Ahn ...................... H04L 5/001 |
| 2020/0007295 | A1* | 1/2020 | Kwak ................... H04L 5/0053 |
| 2020/0187236 | A1* | 6/2020 | Moon ...................... H04L 1/00 |
| 2020/0196343 | A1* | 6/2020 | Marinier ........... H04W 72/1289 |
| 2020/0245395 | A1* | 7/2020 | Zhang .................. H04L 5/0053 |
| 2020/0374960 | A1* | 11/2020 | Deenoo ............. H04W 72/1284 |

FOREIGN PATENT DOCUMENTS

| | | | |
|---|---|---|---|
| WO | 2017057870 | A1 | 4/2017 |
| WO | 2017078411 | A1 | 5/2017 |

OTHER PUBLICATIONS

3GPP TSG RAN WG1 Meeting #68 R1-120236; Title: Search space design for enhanced PDCCH; Agenda Item: 7.6.3; Source: Panasonic; Document for: Discussion and decision; Date and Location: Feb. 6-10, 2012, Dresden, Germany, consisting of 4-pages.

3GPP TSG-RAN WG1 Meeting #70 R1-123600; Title: Discussion on ePDCCH Search Space Design; Agenda Item: 7.6.3; Source: HTC; Document for: Discussion and Decision; Date and Location: Aug. 13-17, 2012, Qingdao, China, consisting of 4-pages.

3GPP TSG RAN WG1 Meeting AH 1801 R1-1800631; Title: On remaining issues of search spaces and blind detection; Agenda Item: 7.3.1.2; Source: InterDigital Inc.; Document for: Discussion and Decision; Date and Location: Jan. 22-26, 2018, Vancouver, Canada, consisting of 6-pages.

International Search Report dated May 29, 2019 for International Application No. PCT/CN2019/079056 filed on Mar. 21, 2019, consisting of 7-pages.

3GPP TSG RAN WG1 Meeting #90bis R1-1718323; Title: Discussions on search space and CORESET designs; Agenda Item: 7.3.1.2; Source: MediaTek Inc.; Document for: Discussion; Date and Location: Oct. 9-13, 2017, Prague, CZ; consisting of 11-pages.

* cited by examiner

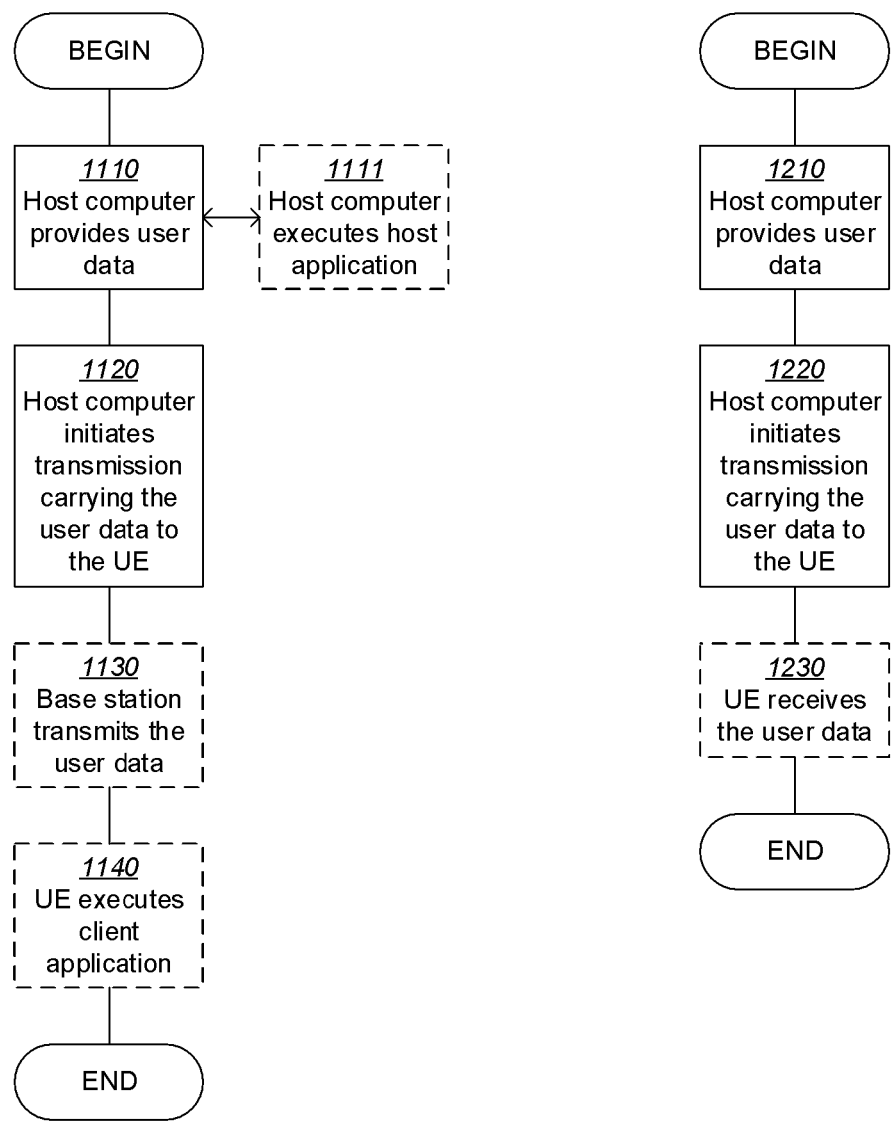

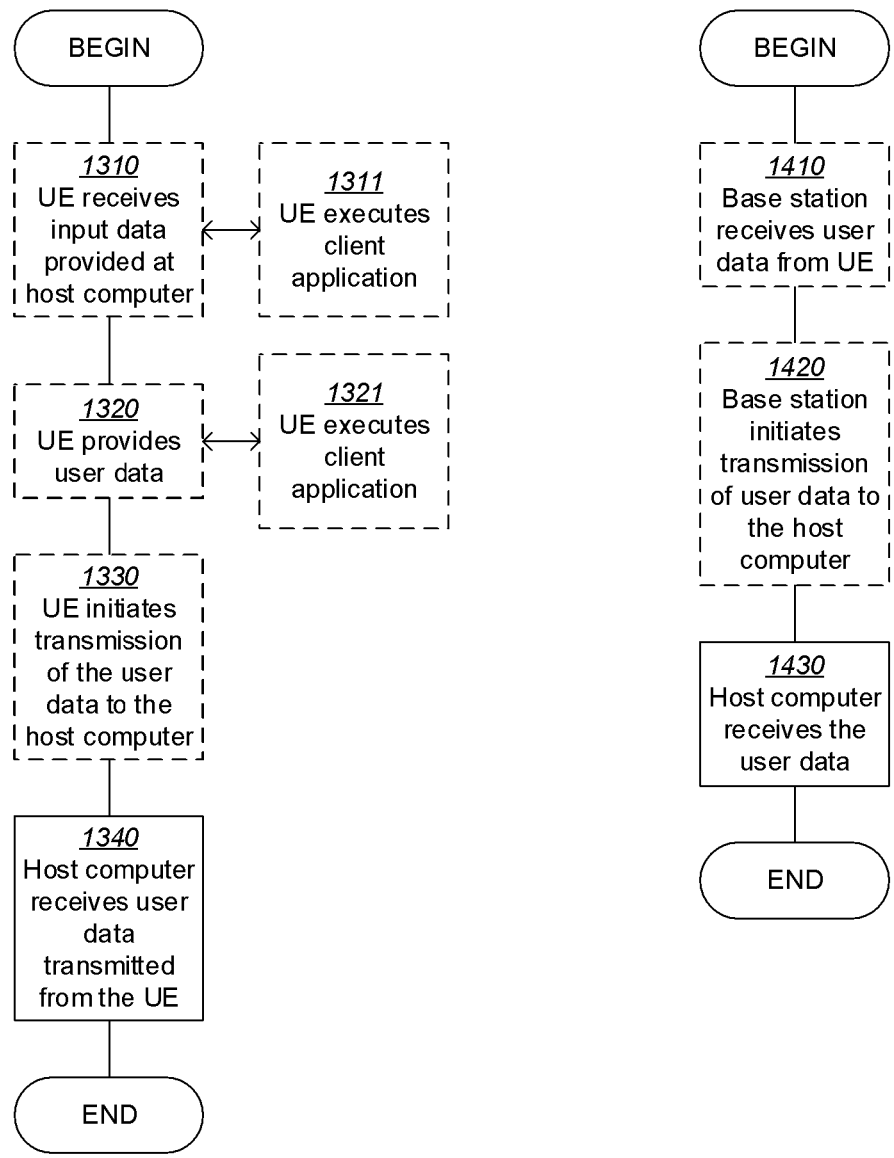

METHODS AND DEVICES FOR PDCCH MONITORING

CROSS-REFERENCE TO RELATED APPLICATIONS

This application is a Submission Under 35 U.S.C. § 371 for U.S. National Stage Patent Application of International Application No.: PCT/CN2019/079056, filed Mar. 21, 2019 entitled "METHOD AND DEVICES FOR PDCCH MONITORING," which claims priority to International Application No.: PCT/CN2018/080268, filed Mar. 23, 2018, the entireties of both of which are incorporated herein by reference.

TECHNICAL FIELD

The present disclosure relates to wireless communications, and more particularly, to methods and devices for Physical Downlink Control Channel (PDCCH) monitoring.

BACKGROUND

Low latency communications, e.g., Ultra Reliable Low Latency Communications (URLLC), can be used in various application scenarios such as remote control of mining machines, factory automation and autopilot. Such application scenarios have similar traffic patterns in which small packet transmission occurs occasionally when necessary.

In order to ensure the low latency, data transmissions have to be very short, which means that either mini slots or large Sub-Carrier Spacings (SCSs) are required. Accordingly, a Core Resource Set (CORESET), or PDCCH search space, needs to occur at a short period.

In New Radio (NR), as in Long Term Evolution (LTE), a PDCCH search space for a terminal device (e.g., a User Equipment, or UE) contains a number of Control Channel Elements (CCEs) and each CCE contains 6 Resource Element Groups (REGs). Depending on a radio link condition, a network device (e.g., a gNB) can determine the number of CCEs required for ensuring reliable transmission of PDCCH by selecting an aggregation level from a set of aggregation level candidates (e.g. 1, 2, 4, 8, 16, etc.). A high aggregation level is typically selected in a worse radio link condition, such that more CCEs can be used for PDCCH transmission.

FIG. 1 shows an example of resource allocation for a PDCCH search space. As shown, the PDCCH search space occurs in every slot (or mini slot) (e.g., a slot can be 0.25 ms at SCS of 60 KHz). For each occurrence of the PDCCH search space, a terminal device shall monitor PDCCH every slot (or mini slot) by blindly detecting a PDCCH transmission for each PDCCH-to-CCE mapping at each aggregation level. For example, as shown in FIG. 1, assuming that there are 16 CCEs, having indices of 0, 1, . . . , 15, in a PDCCH search space, an example of blind detections of PDCCH can be as follows. At the aggregation level 1, i.e., when a PDCCH transmission is mapped to 1 CCE, there are 16 possible PDCCH-to-CCE mappings, requiring 16 blind detection attempts. At the aggregation level 2, i.e., when a PDCCH transmission is mapped to 2 CCEs, there are 8 possible PDCCH-to-CCE mappings (each mapping starts at a CCE having an index i satisfying i mod 2=0), requiring 8 blind detection attempts. At the aggregation level 4, i.e., when a PDCCH transmission is mapped to 4 CCEs, there are 4 possible PDCCH-to-CCE mappings (each mapping starts at a CCE having an index i satisfying i mod 4=0), requiring 4 blind detection attempts. At the aggregation level 8, i.e., when a PDCCH transmission is mapped to 8 CCEs, there are 2 possible PDCCH-to-CCE mappings (each mapping starts at a CCE having an index i satisfying i mod 8=0), requiring 2 blind detection attempts. At the aggregation level 16, i.e., when a PDCCH transmission is mapped to 16 CCEs, there is 1 possible PDCCH-to-CCE mapping, requiring 1 blind detection attempt. Hence, in this case the terminal device needs to perform in total 31 blind detections.

Such blind detections have impacts in two aspects. On one hand, they occupy a delay budget for the terminal device. FIG. 2 shows an example of downlink and uplink timings. As shown, Downlink Control Information (DCI) carrying an uplink grant to schedule a Physical Uplink Shared Channel (PUSCH) transmission is transmitted over PDCCH in a downlink Orthogonal Frequency Division Multiplexing (OFDM) symbol, followed by a Guard Period (GP) for downlink-to-uplink switching. The GP is expected to contain a DCI decoding delay, a PUSCH encoding delay and a Timing Advance (TA) for the PUSCH transmission. The large number of blind detections of PDCCH means a high DCI decoding delay, which in turn results in a tight delay budget for the remaining procedures. This is also the case for downlink data receiving, when the DCI decoding delay shares the delay budget with a Physical Downlink Shared Channel (PDSCH) decoding delay and an Uplink Control Information (UCI) encoding delay.

On the other hand, the blind detections cause high power consumption at the terminal device, especially when uplink or downlink data transmissions are much sparser than the occurrences of PDCCH search spaces. With the short slot (or mini slot) duration, the power consumption at the terminal device due to PDCCH monitoring could be much higher than that in the LTE, where the terminal device is required to monitor PDCCH every 1 ms.

There is thus a need for an improved solution for PDCCH monitoring.

SUMMARY

It is an object of the present disclosure to provide methods and devices for PDCCH monitoring.

According to a first aspect of the present disclosure, a method in a network device for configuration of Physical Downlink Control Channel (PDCCH) monitoring by a terminal device is provided. The method includes: determining a PDCCH monitoring configuration indicating a PDCCH resource pool to be monitored by the terminal device at an aggregation level; and transmitting the PDCCH monitoring configuration to the terminal device.

In an embodiment, the terminal device may be configured with a PDCCH search space and the PDCCH resource pool for the aggregation level may include less than all Control Channel Elements (CCEs) in the PDCCH search space.

In an embodiment, the aggregation level may be lower than or equal to a first threshold level.

In an embodiment, the PDCCH monitoring configuration may further indicate a PDCCH resource pool for an aggregation level higher than the first threshold level that includes all CCEs in the PDCCH search space.

In an embodiment, the PDCCH monitoring configuration may be determined based on a received signal power at the terminal device or the network device.

In an embodiment, when the received signal power is lower than a first threshold power, a PDCCH resource pool for an aggregation level lower than a third threshold level may be null.

In an embodiment, when the received signal power is higher than a second threshold power, a PDCCH resource pool for an aggregation level higher than a fourth threshold level may be null.

In an embodiment, the PDCCH search space may include a common PDCCH search space and/or a dedicated PDCCH search space.

In an embodiment, the PDCCH monitoring configuration may be transmitted via Radio Resource Control (RRC) signaling.

In an embodiment, the method may further include: transmitting an instruction to enable or disable the PDCCH monitoring configuration to the terminal device via a Medium Access Control (MAC) Control Element (CE) or a PDCCH order.

According to a second aspect of the present disclosure, a network device is provided. The network device includes a transceiver, a processor and a memory. The memory includes instructions executable by the processor whereby the network device is operative to perform the method according to the above first aspect.

According to a third aspect of the present disclosure, a computer readable storage medium is provided. The computer readable storage medium has computer program instructions stored thereon. The computer program instructions, when executed by a processor in a network device, cause the network device to perform the method according to the above first aspect.

According to a fourth aspect of the present disclosure, a method in a terminal device for Physical Downlink Control Channel (PDCCH) monitoring is provided. The method includes: receiving from a network device a PDCCH monitoring configuration indicating a PDCCH resource pool to be monitored by the terminal device at an aggregation level; and monitoring a PDCCH from the network device in accordance with the PDCCH monitoring configuration.

In an embodiment, the terminal device may be configured with a PDCCH search space and the PDCCH resource pool for the aggregation level may include less than all Control Channel Elements (CCEs) in the PDCCH search space.

In an embodiment, the aggregation level may be lower than or equal to a first threshold level.

In an embodiment, the PDCCH monitoring configuration may further indicate a PDCCH resource pool for an aggregation level higher than the first threshold level that includes all CCEs in the PDCCH search space.

In an embodiment, the PDCCH monitoring configuration may be dependent on a received signal power at the terminal device or the network device.

In an embodiment, when the received signal power is lower than a first threshold power, a PDCCH resource pool for an aggregation level lower than a third threshold level may be null.

In an embodiment, when the received signal power is higher than a second threshold power, a PDCCH resource pool for an aggregation level higher than a fourth threshold level may be null.

In an embodiment, the PDCCH search space may include a common PDCCH search space and/or a dedicated PDCCH search space.

In an embodiment, the PDCCH monitoring configuration may be received via Radio Resource Control (RRC) signaling.

In an embodiment, the method may further include: receiving an instruction to enable or disable the PDCCH monitoring configuration from the network device via a Medium Access Control (MAC) Control Element (CE) or a PDCCH order.

According to a fifth aspect of the present disclosure, a terminal device is provided. The terminal device includes a transceiver, a processor and a memory. The memory includes instructions executable by the processor whereby the terminal device is operative to perform the method according to the above fourth aspect.

According to a sixth aspect of the present disclosure, a computer readable storage medium is provided. The computer readable storage medium has computer program instructions stored thereon. The computer program instructions, when executed by a processor in a terminal device, cause the terminal device to perform the method according to the above fourth aspect.

With the above embodiments, an aggregation level specific PDCCH resource pool is introduced. When compared with the conventional solution where a terminal device monitors a PDCCH resource space for all aggregation levels, the present disclosure allows for more flexible configuration of PDCCH monitoring and, in some embodiments, makes it possible to reduce the number blind detections of PDCCH by the terminal device, thereby reducing occupation of a delay budget by DCI decoding and saving power consumption at the terminal device.

BRIEF DESCRIPTION OF THE DRAWINGS

The above and other objects, features and advantages will be more apparent from the following description of embodiments with reference to the figures, in which:

FIGS. 11 to 14 are flowcharts illustrating methods implemented in a communication system including a host computer, a base station and a user equipment.

DETAILED DESCRIPTION

Figure 1:
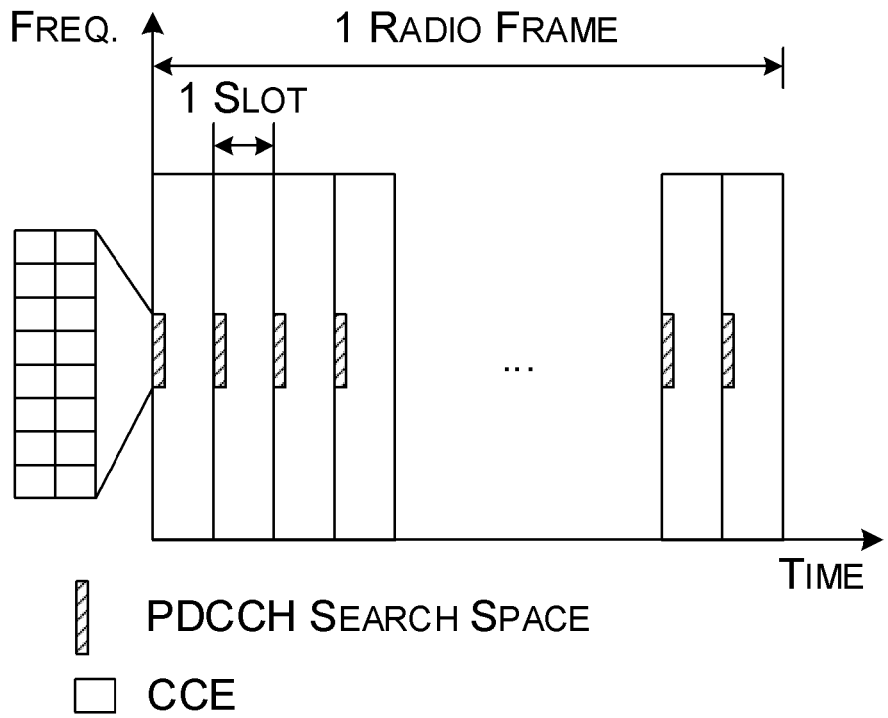
FIG. 1 is a schematic diagram showing an example of resource allocation for a PDCCH search space.
Figure 2:
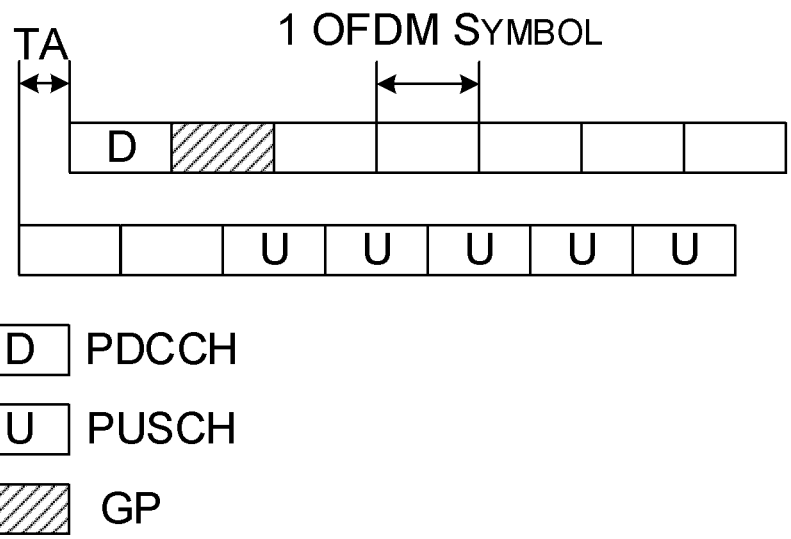
FIG. 2 is a schematic diagram showing an example of downlink and uplink timings.

As used herein, the term "wireless communication network" refers to a network following any suitable communication standards, such as LTE-Advanced (LTE-A), LTE, Wideband Code Division Multiple Access (WCDMA), High-Speed Packet Access (HSPA), and so on. Furthermore, the communications between a terminal device and a network device in the wireless communication network may be performed according to any suitable generation communication protocols, including, but not limited to, Global System for Mobile Communications (GSM), Universal Mobile Telecommunications System (UMTS), Long Term Evolution (LTE), and/or other suitable 1G (the first generation), 2G (the second generation), 2.5G, 2.75G, 3G (the third generation), 4G (the fourth generation), 4.5G, 5G (the fifth generation) communication protocols, wireless local area network (WLAN) standards, such as the IEEE 802.11 standards; and/or any other appropriate wireless communication standard, such as the Worldwide Interoperability for Microwave Access (WiMax), Bluetooth, and/or ZigBee standards, and/or any other protocols either currently known or to be developed in the future.

The term "network device" refers to a device in a wireless communication network via which a terminal device accesses the network and receives services therefrom. The network device refers to a base station (BS), an access point (AP), or any other suitable device in the wireless communication network. The BS may be, for example, a node B (NodeB or NB), an evolved NodeB (eNodeB or eNB), or gNB, a Remote Radio Unit (RRU), a radio header (RH), a remote radio head (RRH), a relay, a low power node such as a femto, a pico, and so forth. Yet further examples of the network device may include multi-standard radio (MSR) radio equipment such as MSR BSs, network controllers such as radio network controllers (RNCs) or base station controllers (BSCs), base transceiver stations (BTSs), transmission points, transmission nodes. More generally, however, the network device may represent any suitable device (or group of devices) capable, configured, arranged, and/or operable to enable and/or provide a terminal device access to the wireless communication network or to provide some service to a terminal device that has accessed the wireless communication network.

The term "terminal device" refers to any end device that can access a wireless communication network and receive services therefrom. By way of example and not limitation, the terminal device refers to a mobile terminal, user equipment (UE), or other suitable devices. The UE may be, for example, a Subscriber Station (SS), a Portable Subscriber Station, a Mobile Station (MS), or an Access Terminal (AT). The terminal device may include, but not limited to, portable computers, image capture terminal devices such as digital cameras, gaming terminal devices, music storage and playback appliances, a mobile phone, a cellular phone, a smart phone, voice over IP (VoIP) phones, wireless local loop phones, a tablet, a wearable device, a personal digital assistant (PDA), desktop computer, wearable terminal devices, vehicle-mounted wireless terminal devices, wireless endpoints, mobile stations, laptop-embedded equipment (LEE), laptop-mounted equipment (LME), USB dongles, smart devices, wireless customer-premises equipment (CPE) and the like. In the following description, the terms "terminal device", "terminal", "user equipment" and "UE" may be used interchangeably. As one example, a terminal device may represent a UE configured for communication in accordance with one or more communication standards promulgated by the 3rd Generation Partnership Project (3GPP), such as 3GPP's GSM, UMTS, LTE, and/or 5G standards. As used herein, a "user equipment" or "UE" may not necessarily have a "user" in the sense of a human user who owns and/or operates the relevant device. In some embodiments, a terminal device may be configured to transmit and/or receive information without direct human interaction. For instance, a terminal device may be designed to transmit information to a network on a predetermined schedule, when triggered by an internal or external event, or in response to requests from the wireless communication network. Instead, a UE may represent a device that is intended for sale to, or operation by, a human user but that may not initially be associated with a specific human user.

The terminal device may support device-to-device (D2D) communication, for example by implementing a 3GPP standard for sidelink communication, and may in this case be referred to as a D2D communication device.

As yet another example, in an Internet of Things (IOT) scenario, a terminal device may represent a machine or other device that performs monitoring and/or measurements, and transmits the results of such monitoring and/or measurements to another terminal device and/or network equipment. The terminal device may in this case be a machine-to-machine (M2M) device, which may in a 3GPP context be referred to as a machine-type communication (MTC) device. As one particular example, the terminal device may be a UE implementing the 3GPP narrow band internet of things (NB-IoT) standard. Particular examples of such machines or devices are sensors, metering devices such as power meters, industrial machinery, or home or personal appliances, for example refrigerators, televisions, personal wearables such as watches etc. In other scenarios, a terminal device may represent a vehicle or other equipment that is capable of monitoring and/or reporting on its operational status or other functions associated with its operation.

As used herein, a downlink, DL transmission refers to a transmission from the network device to a terminal device, and an uplink, UL transmission refers to a transmission in an opposite direction.

References in the specification to "one embodiment," "an embodiment," "an example embodiment," and the like indicate that the embodiment described may include a particular feature, structure, or characteristic, but it is not necessary that every embodiment includes the particular feature, structure, or characteristic.

Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

It shall be understood that although the terms "first" and "second" etc. may be used herein to describe various elements, these elements should not be limited by these terms. These terms are only used to distinguish one element from another. For example, a first element could be termed a second element, and similarly, a second element could be termed a first element, without departing from the scope of example embodiments. As used herein, the term "and/or" includes any and all combinations of one or more of the associated listed terms. The terminology used herein is for the purpose of describing particular embodiments only and is not intended to be liming of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

In the following description and claims, unless defined otherwise, all technical and scientific terms used herein have the same meaning as commonly understood by one of ordinary skills in the art to which this disclosure belongs.

Figure 3:
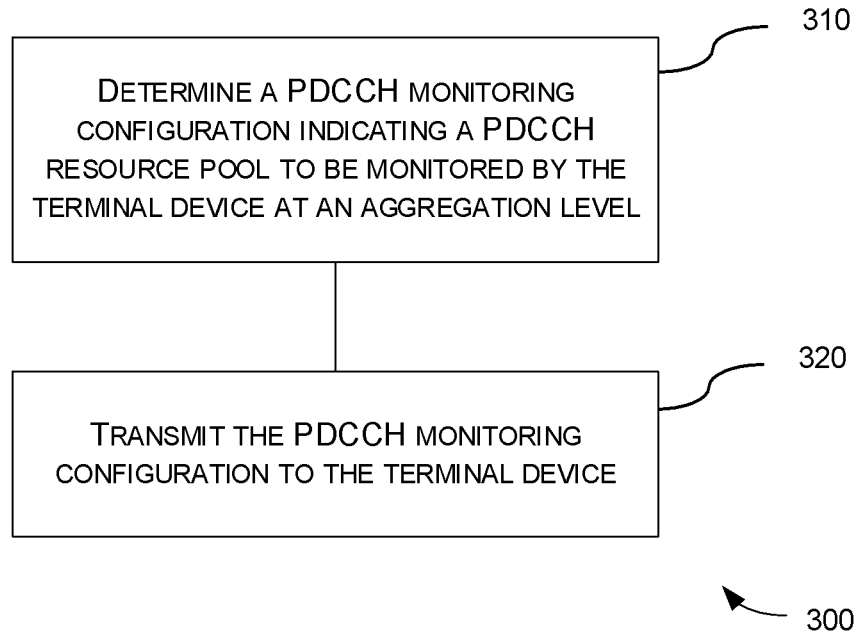
FIG. 3 is a flowchart illustrating a method in a network device for configuration of PDCCH monitoring by a terminal device according to an embodiment of the present disclosure.

FIG. 3 is a flowchart illustrating a method 300 for configuration of PDCCH monitoring by a terminal device according to an embodiment of the present disclosure. The method 300 can be performed at a network device.

At block 310, a PDCCH monitoring configuration is determined. The PDCCH monitoring configuration indicates a PDCCH resource pool to be monitored by the terminal device at an aggregation level. That is, the PDCCH resource pool can be aggregation level specific.

In an example, the terminal device can be configured with a PDCCH search space and the PDCCH resource pool for the aggregation level can include less than all Control Channel Elements (CCEs) in the PDCCH search space.

Here, the aggregation level can be lower than or equal to a first threshold level. In other words, a PDCCH resource pool for an aggregation level lower than or equal to the first threshold level can be determined to include less than all CCEs in the PDCCH search space. On the other hand, a PDCCH resource pool for an aggregation level higher than the first threshold level can be determined to include all CCEs in the PDCCH search space. In this case, the PDCCH monitoring configuration can further indicate a PDCCH resource pool for an aggregation level higher than the first threshold level that include all CCEs in the PDCCH search space.

For example, it is assumed again that there are 16 CCEs, having indices of 0, 1, . . . , 15, in the PDCCH search space and there are five aggregation levels: 1, 2, 4, 8 and 16. The first threshold level can be assumed to be 2. In this case, at the aggregation level 1, the PDCCH resource pool can include only PDCCH-to-CCE mappings each starting at a CCE having an index i satisfying i mod 2=0, thus requiring 8 blind detection attempts for PDCCH. At the aggregation level 2, the PDCCH resource pool can include only PDCCH-to-CCE mappings each starting at a CCE having an index i satisfying i mod 4=0, thus requiring 4 blind detection attempts for PDCCH. For the aggregation levels 4, 8 and 16, the PDCCH resource pool can include all possible PDCCH-to-CCE mappings in the PDCCH search space, thus requiring 4, 2 and 1 blind detection attempt, respectively. In this example, the total number of blind detection attempts for PDCCH is reduced to 19, which means a decrease in computational complexity by 38.7%.

As described above, an aggregation level specific PDCCH resource pool is introduced. It can be smaller than the PDCCH search space at low aggregation levels and can be the same as the latter at high aggregation levels. In this way, the total number of blind detection attempts for PDCCH can be reduced. While some flexibility for PDCCH-to-CCE mappings at low aggregation levels may be lost, it is expected to be acceptable since there still sufficient candidates left.

Alternatively, the PDCCH monitoring configuration can be determined based on a received signal power at the terminal device. The received signal power (e.g., Reference Signal Received Power of Synchronization Signal Block or Channel Status Information Reference Signal, i.e. SSB-RSRP or CSI-RS-RSRP) can be measured at the terminal device and reported back to the network device. As an alternative, the PDCCH monitoring configuration can be determined based on a received signal power at the network device. In either case, the received signal power can reflect a distance and/or a radio link condition between the network device and the terminal device. As an alternative to the received signal power, a Signal to Interference and Noise Ratio (SINR) or path loss measured at the terminal device or the network device can be used.

In an example, when the received signal power is lower than a threshold power, P1, a PDCCH resource pool for an aggregation level lower than a third threshold level can be null. For example, the third threshold level can be assumed to be 2. In this case, when the received signal power is lower than P1, the PDCCH resource pool for the aggregation level 1 is null and the terminal device would perform blind detection of PDCCH from the aggregation level 2, without performing any blind detection of PDCCH at the aggregation level 1. In this case, the total number of blind detection attempts for PDCCH is reduced to 15, which means a decrease in computational complexity by 51.1%.

As another example, another threshold power, P1' (P1'<P1), can be set and, when the received signal power is lower than P1 but higher than or equal to P1', a PDCCH resource pool for an aggregation level lower than the third threshold level can be null, and when the received signal power is lower than P1', a PDCCH resource pool for an aggregation level lower than another threshold level can be null. For example, the third threshold level can be assumed to be 2 and the other threshold level can be 4. In this case, when the received signal power is lower than P1 but higher than or equal to P1', the PDCCH resource pool for the aggregation level 1 is null and the terminal device would perform blind detection of PDCCH from the aggregation level 2, without performing any blind detection of PDCCH at the aggregation level 1. When the received signal power is lower than P1', the PDCCH resource pools for the aggregation levels 1 and 2 are null and the terminal device would perform blind detection of PDCCH from the aggregation level 4, without performing any blind detection of PDCCH at the aggregation levels 1 and 2 (leading to a decrease in computational complexity by 77.4%).

The reason to skip some aggregation level is as follows. For URLLC services, it has been agreed that the misdetection rate of PDCCH shall be lower than 0.1%, while for other services, the midsection rate of PDCCH shall be lower than 1%. When the terminal device is far from the network device and/or has a bad radio link condition with the network device, some low aggregation level will not be selected by the network device in order to ensure the reliability of PDCCH detection. Moreover, a terminal device far from the network device typically requires a large TA for uplink transmissions. The reduced time for PDCCH detections (i.e., reduced DCI decoding delay) allows more time for PUSCH encoding within the delay budget.

On the other hand, when the terminal device is close to the network device and/or has a good radio link condition with the network device, some high aggregation level may not be selected by the network device. In this case, when the received signal power is higher than a second threshold power, a PDCCH resource pool for an aggregation level higher than a fourth threshold level can be null. In an example, the fourth threshold level can be 4.

As an alternative to a null PDCCH resource pool, the PDCCH monitoring configuration can include an explicit instruction to skip or reduce blind detections of PDCCH at one or more aggregation levels, such that the terminal device can refrain from PDCCH detection at the one or more aggregation levels.

Alternatively, one or more PDCCH monitoring patterns can be predefined. Each PDCCH monitoring pattern represents respective PDCCH-to-CCE mappings to be monitored by the terminal device at one or more aggregation levels. The PDCCH monitoring configuration can indicate which of the predefined PDCCH monitoring patterns is to be used at the terminal device.

Here, the PDCCH search space can include a common PDCCH search space and/or a dedicated PDCCH search space. That is, the PDCCH resource pool can be applied to PDCCH detections in the common search space or the dedicated search space.

At block 320, the PDCCH monitoring configuration is transmitted to the terminal device. In an example, the PDCCH monitoring configuration can be transmitted via Radio Resource Control (RRC) signaling.

In an example, the network device can further transmit an instruction to enable or disable the PDCCH monitoring configuration to the terminal device via a Medium Access Control (MAC) Control Element (CE) or a PDCCH order. Alternatively, the instruction can also be transmitted via RRC signaling. When the PDCCH monitoring configuration is not enabled or is disabled, the terminal device can monitor PDCCH transmissions in the entire PDCCH search space.

Figure 4:
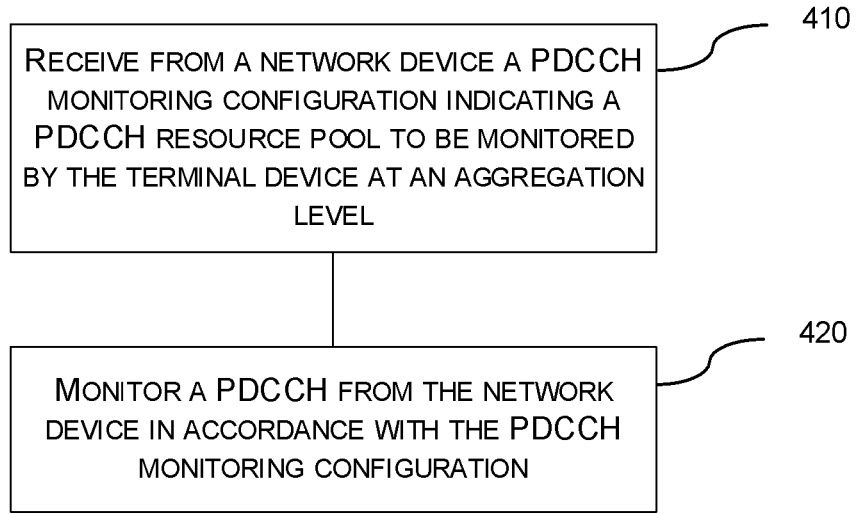
FIG. 4 is a flowchart illustrating a method in a terminal device for PDCCH monitoring according to an embodiment of the present disclosure.

FIG. 4 is a flowchart illustrating a method 400 for PDCCH monitoring according to an embodiment of the present disclosure. The method 400 can be performed at a terminal device.

At block 410, a PDCCH monitoring configuration is received from a network device. The PDCCH monitoring configuration indicates a PDCCH resource pool to be monitored by the terminal device at an aggregation level.

In an example, the terminal device can be configured with a PDCCH search space and the PDCCH resource pool for the aggregation level can include less than all CCEs in the PDCCH search space.

Here, the aggregation level can be lower than or equal to a first threshold level. In other words, a PDCCH resource pool for an aggregation level lower than or equal to the first threshold level can include less than all CCEs in the PDCCH search space. On the other hand, a PDCCH resource pool for an aggregation level higher than the first threshold level can include all CCEs in the PDCCH search space. In this case, the PDCCH monitoring configuration can further indicate a PDCCH resource pool for an aggregation level higher than the first threshold level that include all CCEs in the PDCCH search space.

Alternatively, the PDCCH monitoring configuration can be dependent on a received signal power at the terminal device. The received signal power (e.g., RSRP) can be measured at the terminal device and reported back to the network device. As an alternative, the PDCCH monitoring configuration can be dependent on a received signal power at the network device. As an alternative to the received signal power, a SINR or path loss measured at the terminal device or the network device can be used.

In an example, when the received signal power is lower than a threshold power, P1, a PDCCH resource pool for an aggregation level lower than a third threshold level can be null. In another example, another threshold power, P1' (P1'<P1), can be set and, when the received signal power is lower than P1 but higher than or equal to P1', a PDCCH resource pool for an aggregation level lower than the third threshold level can be null, and when the received signal power is lower than P1', a PDCCH resource pool for an aggregation level lower than another threshold level can be null.

On the other hand, when the received signal power is higher than a second threshold power, a PDCCH resource pool for an aggregation level higher than a fourth threshold level can be null.

As an alternative to a null PDCCH resource pool, the PDCCH monitoring configuration can include an explicit instruction to skip or reduce blind detections of PDCCH at one or more aggregation levels, such that the terminal device can refrain from PDCCH detection at the one or more aggregation levels.

Alternatively, one or more PDCCH monitoring patterns can be predefined. Each PDCCH monitoring pattern represents respective PDCCH-to-CCE mappings to be monitored by the terminal device at one or more aggregation levels. The PDCCH monitoring configuration can indicate which of the predefined PDCCH monitoring patterns is to be used at the terminal device. Optionally, the terminal device can select one of the predefined PDCCH monitoring patterns in accordance with a preconfigured rule, e.g., based on a received signal power at the terminal device.

Here, the PDCCH search space can include a common PDCCH search space and/or a dedicated PDCCH search space. That is, the PDCCH resource pool can be applied to PDCCH detections in the common search space or the dedicated search space.

At block 420, a PDCCH from the network device is monitored in accordance with the PDCCH monitoring configuration. In an example, the PDCCH monitoring configuration can be received via Radio Resource Control (RRC) signaling.

In an example, the terminal device can further receive an instruction to enable or disable the PDCCH monitoring configuration from the network device via a MAC CE or a PDCCH order, or alternatively via RRC signaling. When the PDCCH monitoring configuration is not enabled or is disabled, the terminal device can monitor PDCCH transmissions in the entire PDCCH search space.

Figure 5:
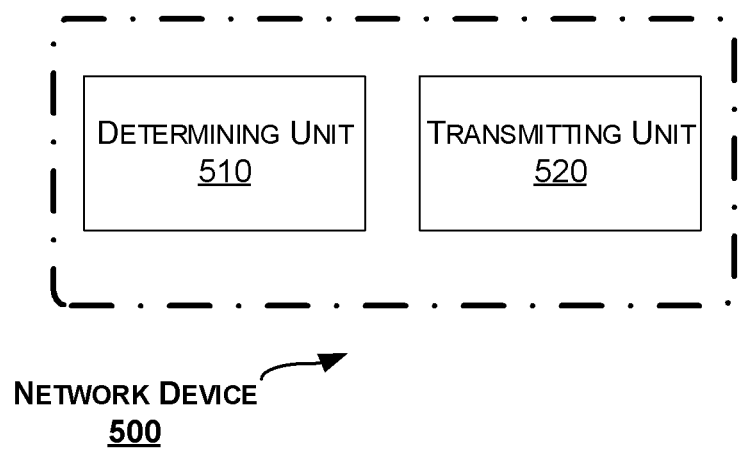
FIG. 5 is a block diagram of a network device according to an embodiment of the present disclosure.

Correspondingly to the method 300 as described above, a network device is provided. FIG. 5 is a block diagram of a network device 500 according to an embodiment of the present disclosure. The network device 500 can configure PDCCH monitoring by a terminal device.

As shown in FIG. 5, the network device 500 includes a determining unit 510 configured to determine a PDCCH monitoring configuration indicating a PDCCH resource pool to be monitored by the terminal device at an aggregation level. The network device 500 further includes a transmitting unit 520 configured to transmit the PDCCH monitoring configuration to the terminal device.

In an embodiment, the terminal device can be configured with a PDCCH search space and the PDCCH resource pool for the aggregation level can include less than all CCEs in the PDCCH search space.

In an embodiment, the aggregation level can be lower than or equal to a first threshold level.

In an embodiment, the PDCCH monitoring configuration can further indicate a PDCCH resource pool for an aggregation level higher than the first threshold level that includes all CCEs in the PDCCH search space.

In an embodiment, the PDCCH monitoring configuration can be determined based on a received signal power at the terminal device or the network device.

In an embodiment, when the received signal power is lower than a first threshold power, a PDCCH resource pool for an aggregation level lower than a third threshold level can be null.

In an embodiment, when the received signal power is higher than a second threshold power, a PDCCH resource pool for an aggregation level higher than a fourth threshold level can be null.

In an embodiment, the PDCCH search space can include a common PDCCH search space and/or a dedicated PDCCH search space.

In an embodiment, the PDCCH monitoring configuration can be transmitted via RRC signaling.

In an embodiment, the transmitting unit 520 can further be configured to transmit an instruction to enable or disable the PDCCH monitoring configuration to the terminal device via a MAC CE or a PDCCH order.

The determining unit 510 and the transmitting unit 520 can be implemented as a pure hardware solution or as a combination of software and hardware, e.g., by one or more of: a processor or a micro-processor and adequate software and memory for storing of the software, a Programmable Logic Device (PLD) or other electronic component(s) or processing circuitry configured to perform the actions described above, and illustrated, e.g., in FIG. 3.

Figure 6:
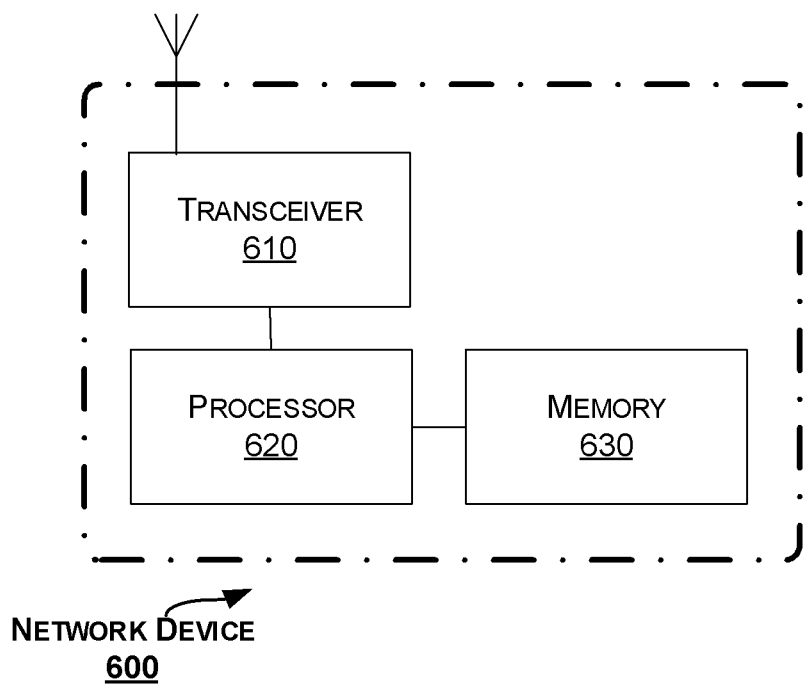
FIG. 6 is a block diagram of a network device according to another embodiment of the present disclosure.

FIG. 6 is a block diagram of a network device 600 according to another embodiment of the present disclosure. The network device 600 can configure PDCCH monitoring by a terminal device.

The network device 600 includes a transceiver 610, a processor 620 and a memory 630. The memory 630 contains instructions executable by the processor 620 whereby the network device 600 is operative to perform the actions, e.g., of the procedure described earlier in conjunction with FIG. 3. Particularly, the memory 630 contains instructions executable by the processor 620 whereby the network device 600 is operative to: determine a PDCCH monitoring configuration indicating a PDCCH resource pool to be monitored by the terminal device at an aggregation level; and transmit the PDCCH monitoring configuration to the terminal device.

In an embodiment, the terminal device can be configured with a PDCCH search space and the PDCCH resource pool for the aggregation level can include less than all CCEs in the PDCCH search space.

In an embodiment, the aggregation level can be lower than or equal to a first threshold level.

In an embodiment, the PDCCH monitoring configuration can further indicate a PDCCH resource pool for an aggregation level higher than the first threshold level that includes all CCEs in the PDCCH search space.

In an embodiment, the PDCCH monitoring configuration can be determined based on a received signal power at the terminal device or the network device.

In an embodiment, when the received signal power is lower than a first threshold power, a PDCCH resource pool for an aggregation level lower than a third threshold level can be null.

In an embodiment, when the received signal power is higher than a second threshold power, a PDCCH resource pool for an aggregation level higher than a fourth threshold level can be null.

In an embodiment, the PDCCH search space can include a common PDCCH search space and/or a dedicated PDCCH search space.

In an embodiment, the PDCCH monitoring configuration can be transmitted via RRC signaling.

In an embodiment, the memory 630 can further contain instructions executable by the processor 620 whereby the network device 600 is operative to: transmit an instruction to enable or disable the PDCCH monitoring configuration to the terminal device via a MAC CE or a PDCCH order.

Figure 7:
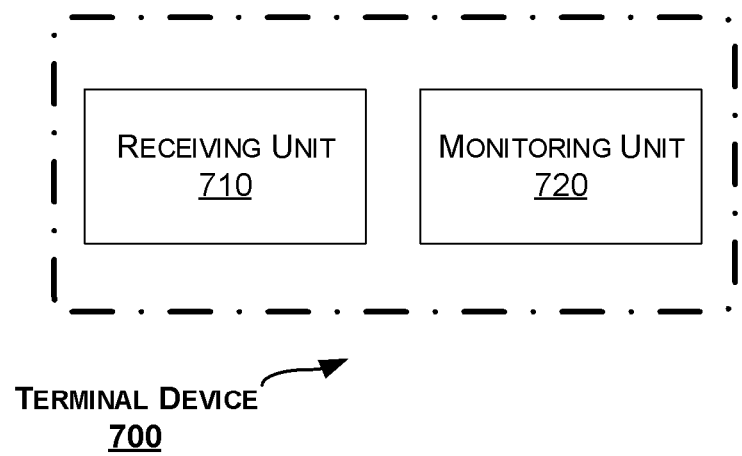
FIG. 7 is a block diagram of a terminal device according to an embodiment of the present disclosure.

Correspondingly to the method 400 as described above, a terminal device is provided. FIG. 7 is a block diagram of a terminal device 700 according to an embodiment of the present disclosure.

As shown in FIG. 7, the terminal device 700 includes a receiving unit 710 configured to receive from a network device a PDCCH monitoring configuration indicating a PDCCH resource pool to be monitored by the terminal device at an aggregation level. The terminal device 700 further includes a monitoring unit 720 configured to monitor a PDCCH from the network device in accordance with the PDCCH monitoring configuration.

In an embodiment, the terminal device can be configured with a PDCCH search space and the PDCCH resource pool for the aggregation level can include less than all CCEs in the PDCCH search space.

In an embodiment, the aggregation level can be lower than or equal to a first threshold level.

In an embodiment, the PDCCH monitoring configuration can further indicate a PDCCH resource pool for an aggregation level higher than the first threshold level that includes all CCEs in the PDCCH search space.

In an embodiment, the PDCCH monitoring configuration can be dependent on a received signal power at the terminal device or the network device.

In an embodiment, when the received signal power is lower than a first threshold power, a PDCCH resource pool for an aggregation level lower than a third threshold level can be null.

In an embodiment, when the received signal power is higher than a second threshold power, a PDCCH resource pool for an aggregation level higher than a fourth threshold level can be null.

In an embodiment, the PDCCH search space can include a common PDCCH search space and/or a dedicated PDCCH search space.

In an embodiment, the PDCCH monitoring configuration can be received via RRC signaling.

In an embodiment, the receiving unit 710 can further be configured to receive an instruction to enable or disable the PDCCH monitoring configuration from the network device via a MAC CE or a PDCCH order.

The receiving unit 710 and the monitoring unit 720 can be implemented as a pure hardware solution or as a combination of software and hardware, e.g., by one or more of: a processor or a micro-processor and adequate software and memory for storing of the software, a Programmable Logic Device (PLD) or other electronic component(s) or processing circuitry configured to perform the actions described above, and illustrated, e.g., in FIG. 4.

Figure 8:
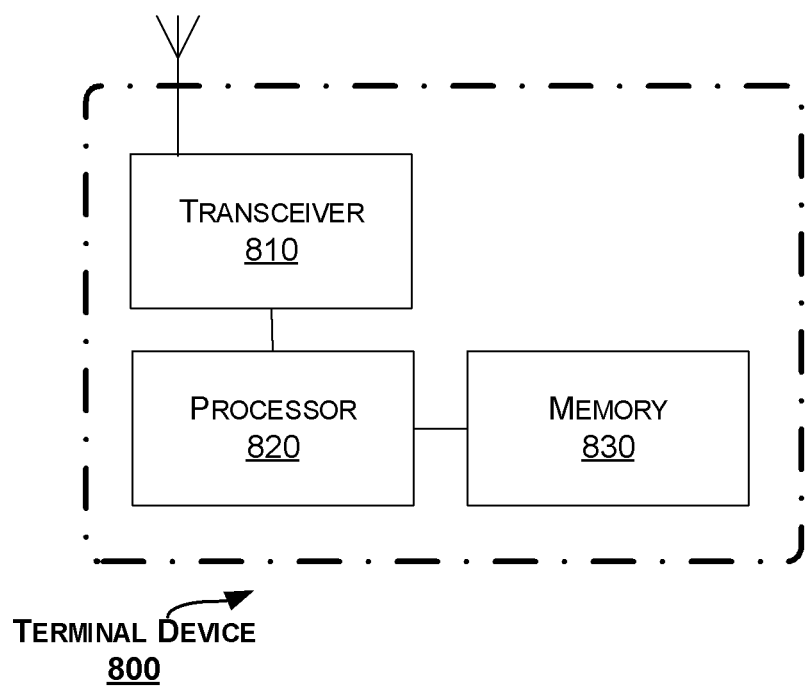
FIG. 8 is a block diagram of a terminal device according to another embodiment of the present disclosure.

FIG. 8 is a block diagram of a terminal device 800 according to another embodiment of the present disclosure.

The terminal device 800 includes a transceiver 810, a processor 820 and a memory 830. The memory 830 contains instructions executable by the processor 820 whereby the terminal device 800 is operative to perform the actions, e.g., of the procedure described earlier in conjunction with FIG. 4. Particularly, the memory 830 contains instructions executable by the processor 820 whereby the terminal device 800 is operative to: receive from a network device a PDCCH monitoring configuration indicating a PDCCH resource pool to be monitored by the terminal device at an aggregation level; and monitor a PDCCH from the network device in accordance with the PDCCH monitoring configuration.

In an embodiment, the terminal device can be configured with a PDCCH search space and the PDCCH resource pool for the aggregation level can include less than all CCEs in the PDCCH search space.

In an embodiment, the aggregation level can be lower than or equal to a first threshold level.

In an embodiment, the PDCCH monitoring configuration can further indicate a PDCCH resource pool for an aggregation level higher than the first threshold level that includes all CCEs in the PDCCH search space.

In an embodiment, the PDCCH monitoring configuration can be dependent on a received signal power at the terminal device or the network device.

In an embodiment, when the received signal power is lower than a first threshold power, a PDCCH resource pool for an aggregation level lower than a third threshold level can be null.

In an embodiment, when the received signal power is higher than a second threshold power, a PDCCH resource pool for an aggregation level higher than a fourth threshold level can be null.

In an embodiment, the PDCCH search space can include a common PDCCH search space and/or a dedicated PDCCH search space.

In an embodiment, the PDCCH monitoring configuration can be received via RRC signaling.

In an embodiment, the memory 830 can further contain instructions executable by the processor 820 whereby the terminal device 800 is operative to: receive an instruction to enable or disable the PDCCH monitoring configuration from the network device via a MAC CE or a PDCCH order.

The present disclosure also provides at least one computer program product in the form of a non-volatile or volatile memory, e.g., a non-transitory computer readable storage medium, an Electrically Erasable Programmable Read-Only Memory (EEPROM), a flash memory and a hard drive. The computer program product includes a computer program. The computer program includes:

code/computer readable instructions, which when executed by the processor 620 causes the network device 600 to perform the actions, e.g., of the procedure described earlier in conjunction with FIG. 3; or code/computer readable instructions, which when executed by the processor 820 causes the terminal device 800 to perform the actions, e.g., of the procedure described earlier in conjunction with FIG. 4.

The computer program product may be configured as a computer program code structured in computer program modules. The computer program modules could essentially perform the actions of the flow illustrated in FIG. 3 or 4.

The processor may be a single CPU (Central processing unit), but could also comprise two or more processing units. For example, the processor may include general purpose microprocessors; instruction set processors and/or related chips sets and/or special purpose microprocessors such as Application Specific Integrated Circuit (ASICs). The processor may also comprise board memory for caching purposes. The computer program may be carried by a computer program product connected to the processor. The computer program product may comprise a non-transitory computer readable storage medium on which the computer program is stored. For example, the computer program product may be a flash memory, a Random-access memory (RAM), a Read-Only Memory (ROM), or an EEPROM, and the computer program modules described above could in alternative embodiments be distributed on different computer program products in the form of memories.

Figure 9:
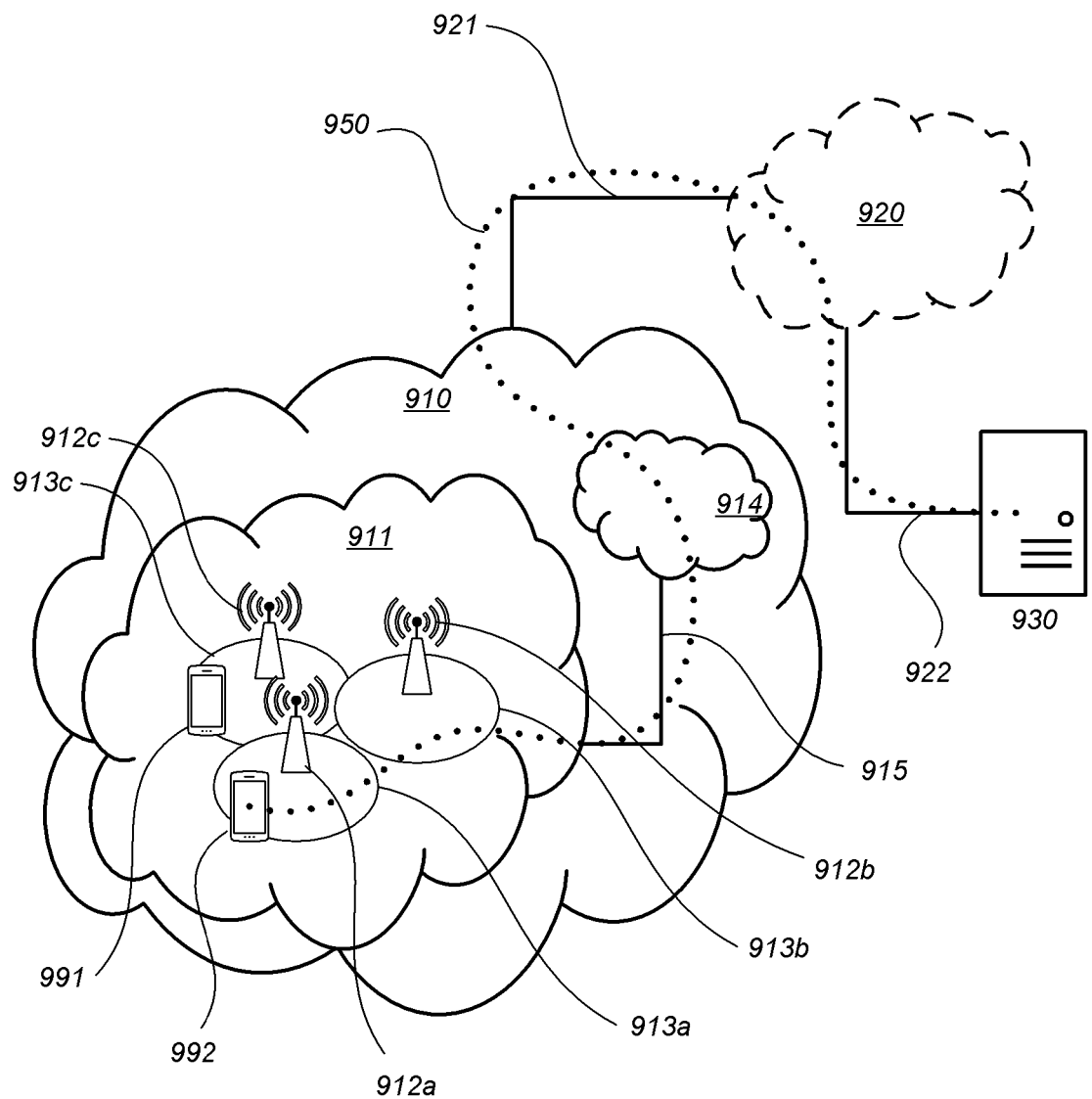
FIG. 9 schematically illustrates a telecommunication network connected via an intermediate network to a host computer.

With reference to FIG. 9, in accordance with an embodiment, a communication system includes a telecommunication network 910, such as a 3GPP-type cellular network, which comprises an access network 911, such as a radio access network, and a core network 914. The access network 911 comprises a plurality of base stations 912a, 912b, 912c, such as NBs, eNBs, gNBs or other types of wireless access points, each defining a corresponding coverage area 913a, 913b, 913c. Each base station 912a, 912b, 912c is connectable to the core network 914 over a wired or wireless connection 915. A first user equipment (UE) 991 located in coverage area 913c is configured to wirelessly connect to, or be paged by, the corresponding base station 912c. A second UE 992 in coverage area 913a is wirelessly connectable to the corresponding base station 912a. While a plurality of UEs 991, 992 are illustrated in this example, the disclosed embodiments are equally applicable to a situation where a sole UE is in the coverage area or where a sole UE is connecting to the corresponding base station 912.

The telecommunication network 910 is itself connected to a host computer 930, which may be embodied in the hardware and/or software of a standalone server, a cloud-implemented server, a distributed server or as processing resources in a server farm. The host computer 930 may be under the ownership or control of a service provider, or may be operated by the service provider or on behalf of the service provider. The connections 921, 922 between the telecommunication network 910 and the host computer 930 may extend directly from the core network 914 to the host computer 930 or may go via an optional intermediate network 920. The intermediate network 920 may be one of, or a combination of more than one of, a public, private or hosted network; the intermediate network 920, if any, may be a backbone network or the Internet; in particular, the intermediate network 920 may comprise two or more sub-networks (not shown).

The communication system of FIG. 9 as a whole enables connectivity between one of the connected UEs 991, 992 and the host computer 930. The connectivity may be described as an over-the-top (OTT) connection 950. The host computer 930 and the connected UEs 991, 992 are configured to communicate data and/or signaling via the OTT connection 950, using the access network 911, the core network 914, any intermediate network 920 and possible further infrastructure (not shown) as intermediaries. The OTT connection 950 may be transparent in the sense that the participating communication devices through which the OTT connection 950 passes are unaware of routing of uplink and downlink communications. For example, a base station 912 may not or need not be informed about the past routing of an incoming downlink communication with data originating from a host computer 930 to be forwarded (e.g., handed over) to a connected UE 991. Similarly, the base station 912 need not be aware of the future routing of an outgoing uplink communication originating from the UE 991 towards the host computer 930.

Example implementations, in accordance with an embodiment, of the UE, base station and host computer discussed in the preceding paragraphs will now be described with reference to FIG. 10. In a communication system 1000, a host computer 1010 comprises hardware 1015 including a communication interface 1016 configured to set up and maintain a wired or wireless connection with an interface of a different communication device of the communication system 1000. The host computer 1010 further comprises processing circuitry 1018, which may have storage and/or processing capabilities. In particular, the processing circuitry 1018 may comprise one or more programmable processors, application-specific integrated circuits, field programmable gate arrays or combinations of these (not shown) adapted to execute instructions. The host computer 1010 further comprises software 1011, which is stored in or accessible by the host computer 1010 and executable by the processing circuitry 1018. The software 1011 includes a host application 1012. The host application 1012 may be operable to provide a service to a remote user, such as a UE 1030 connecting via an OTT connection 1050 terminating at the UE 1030 and the host computer 1010. In providing the service to the remote user, the host application 1012 may provide user data which is transmitted using the OTT connection 1050.

The communication system 1000 further includes a base station 1020 provided in a telecommunication system and comprising hardware 1025 enabling it to communicate with the host computer 1010 and with the UE 1030. The hardware 1025 may include a communication interface 1026 for setting up and maintaining a wired or wireless connection with an interface of a different communication device of the communication system 1000, as well as a radio interface 1027 for setting up and maintaining at least a wireless connection 1070 with a UE 1030 located in a coverage area (not shown in FIG. 10) served by the base station 1020. The communication interface 1026 may be configured to facilitate a connection 1060 to the host computer 1010. The connection 1060 may be direct or it may pass through a core network (not shown in FIG. 10) of the telecommunication system and/or through one or more intermediate networks outside the telecommunication system. In the embodiment shown, the hardware 1025 of the base station 1020 further includes processing circuitry 1028, which may comprise one or more programmable processors, application-specific integrated circuits, field programmable gate arrays or combinations of these (not shown) adapted to execute instructions. The base station 1020 further has software 1021 stored internally or accessible via an external connection.

The communication system 1000 further includes the UE 1030 already referred to. Its hardware 1035 may include a radio interface 1037 configured to set up and maintain a wireless connection 1070 with a base station serving a coverage area in which the UE 1030 is currently located. The hardware 1035 of the UE 1030 further includes processing circuitry 1038, which may comprise one or more programmable processors, application-specific integrated circuits, field programmable gate arrays or combinations of these (not shown) adapted to execute instructions. The UE 1030 further comprises software 1031, which is stored in or accessible by the UE 1030 and executable by the processing circuitry 1038. The software 1031 includes a client application 1032. The client application 1032 may be operable to provide a service to a human or non-human user via the UE 1030, with the support of the host computer 1010. In the host computer 1010, an executing host application 1012 may communicate with the executing client application 1032 via the OTT connection 1050 terminating at the UE 1030 and the host computer 1010. In providing the service to the user, the client application 1032 may receive request data from the host application 1012 and provide user data in response to the request data. The OTT connection 1050 may transfer both the request data and the user data. The client application 1032 may interact with the user to generate the user data that it provides.

Figure 10:
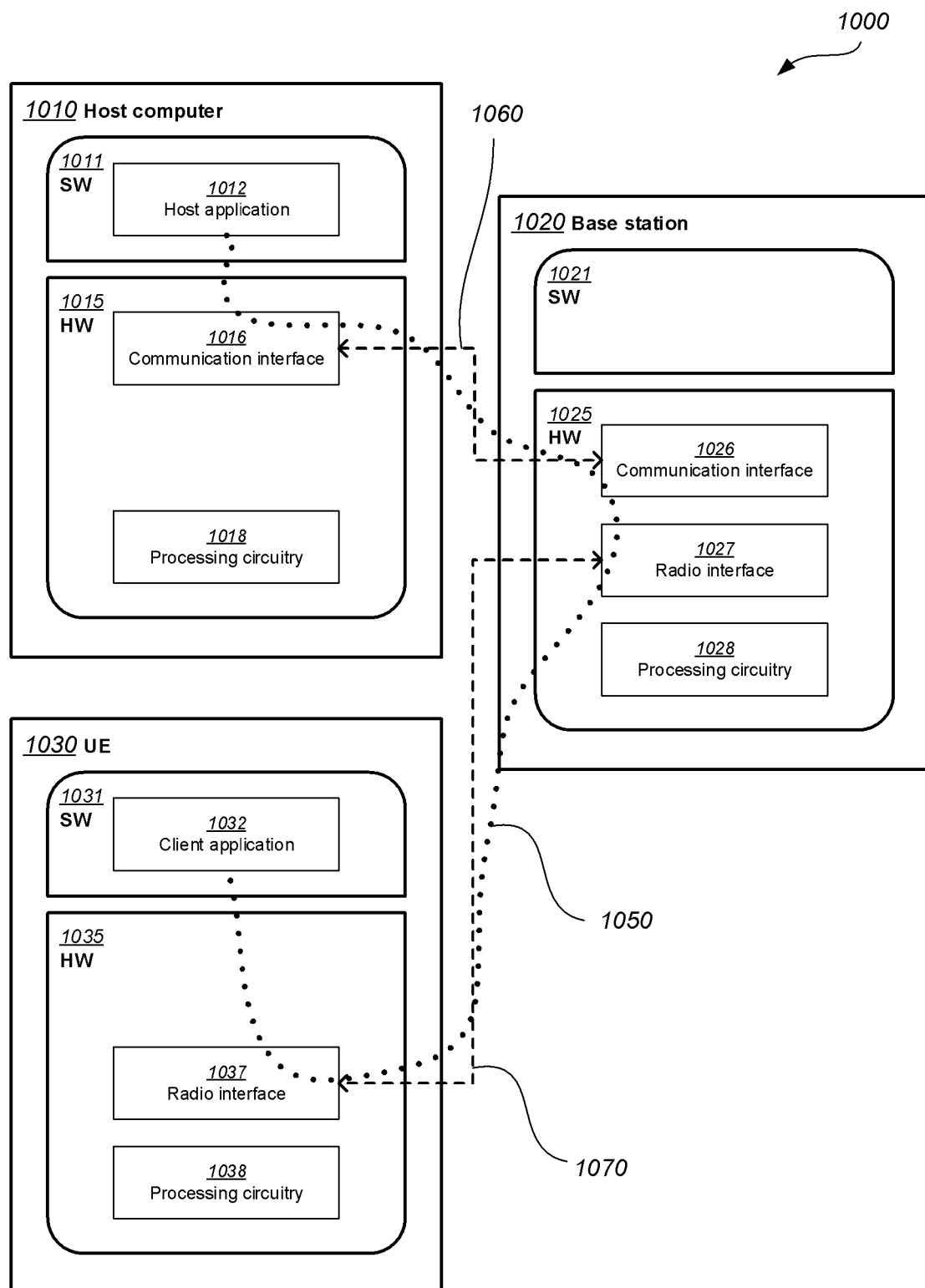
FIG. 10 is a generalized block diagram of a host computer communicating via a base station with a user equipment over a partially wireless connection.

It is noted that the host computer 1010, base station 1020 and UE 1030 illustrated in FIG. 10 may be identical to the host computer 930, one of the base stations 912*a*, 912*b*, 912*c* and one of the UEs 991, 992 of FIG. 9, respectively. This is to say, the inner workings of these entities may be as shown in FIG. 10 and independently, the surrounding network topology may be that of FIG. 9.

In FIG. 10, the OTT connection 1050 has been drawn abstractly to illustrate the communication between the host computer 1010 and the use equipment 1030 via the base station 1020, without explicit reference to any intermediary devices and the precise routing of messages via these devices. Network infrastructure may determine the routing, which it may be configured to hide from the UE 1030 or from the service provider operating the host computer 1010, or both. While the OTT connection 1050 is active, the network infrastructure may further take decisions by which it dynamically changes the routing (e.g., on the basis of load balancing consideration or reconfiguration of the network).

The wireless connection 1070 between the UE 1030 and the base station 1020 is in accordance with the teachings of the embodiments described throughout this disclosure. One or more of the various embodiments improve the performance of OTT services provided to the UE 1030 using the OTT connection 1050, in which the wireless connection 1070 forms the last segment. More precisely, the teachings of these embodiments may reduce PDCCH detection time and complexity and thereby provide benefits such as reduced user waiting time and reduced power consumption at the UE.

A measurement procedure may be provided for the purpose of monitoring data rate, latency and other factors on which the one or more embodiments improve. There may further be an optional network functionality for reconfiguring the OTT connection 1050 between the host computer 1010 and UE 1030, in response to variations in the measurement results. The measurement procedure and/or the network functionality for reconfiguring the OTT connection 1050 may be implemented in the software 1011 of the host computer 1010 or in the software 1031 of the UE 1030, or both. In embodiments, sensors (not shown) may be deployed in or in association with communication devices through which the OTT connection 1050 passes; the sensors may participate in the measurement procedure by supplying values of the monitored quantities exemplified above, or supplying values of other physical quantities from which software 1011, 1031 may compute or estimate the monitored quantities. The reconfiguring of the OTT connection 1050 may include message format, retransmission settings, preferred routing etc.; the reconfiguring need not affect the base station 1020, and it may be unknown or imperceptible to the base station 1020. Such procedures and functionalities may be known and practiced in the art. In certain embodiments, measurements may involve proprietary UE signaling facilitating the host computer's 1010 measurements of throughput, propagation times, latency and the like. The measurements may be implemented in that the software 1011, 1031 causes messages to be transmitted, in particular empty or 'dummy' messages, using the OTT connection 1050 while it monitors propagation times, errors etc.

FIG. 11 is a flowchart illustrating a method implemented in a communication system, in accordance with one embodiment. The communication system includes a host computer, a base station and a UE which may be those described with reference to FIGS. 9 and 10. For simplicity of the present disclosure, only drawing references to FIG. 11 will be included in this section. In a first step 1110 of the method, the host computer provides user data. In an optional substep 1111 of the first step 1110, the host computer provides the user data by executing a host application. In a second step 1120, the host computer initiates a transmission carrying the user data to the UE. In an optional third step 1130, the base station transmits to the UE the user data which was carried in the transmission that the host computer initiated, in accordance with the teachings of the embodiments described throughout this disclosure. In an optional fourth step 1140, the UE executes a client application associated with the host application executed by the host computer.

FIG. 12 is a flowchart illustrating a method implemented in a communication system, in accordance with one embodiment. The communication system includes a host computer, a base station and a UE which may be those described with reference to FIGS. 9 and 10. For simplicity of the present disclosure, only drawing references to FIG. 12 will be included in this section. In a first step 1210 of the method, the host computer provides user data. In an optional substep (not shown) the host computer provides the user data by executing a host application. In a second step 1220, the host computer initiates a transmission carrying the user data to the UE. The transmission may pass via the base station, in accordance with the teachings of the embodiments described throughout this disclosure. In an optional third step 1230, the UE receives the user data carried in the transmission.

FIG. 13 is a flowchart illustrating a method implemented in a communication system, in accordance with one embodiment. The communication system includes a host computer, a base station and a UE which may be those described with reference to FIGS. 9 and 10. For simplicity of the present disclosure, only drawing references to FIG. 13 will be included in this section. In an optional first step 1310 of the method, the UE receives input data provided by the host computer. Additionally or alternatively, in an optional second step 1320, the UE provides user data. In an optional substep 1321 of the second step 1320, the UE provides the user data by executing a client application. In a further optional substep 1311 of the first step 1310, the UE executes a client application which provides the user data in reaction to the received input data provided by the host computer. In providing the user data, the executed client application may further consider user input received from the user. Regardless of the specific manner in which the user data was provided, the UE initiates, in an optional third substep 1330, transmission of the user data to the host computer. In a fourth step 1340 of the method, the host computer receives the user data transmitted from the UE, in accordance with the teachings of the embodiments described throughout this disclosure.

FIG. 14 is a flowchart illustrating a method implemented in a communication system, in accordance with one embodiment. The communication system includes a host computer, a base station and a UE which may be those described with reference to FIGS. 9 and 10. For simplicity of the present disclosure, only drawing references to FIG. 14 will be included in this section. In an optional first step 1410 of the method, in accordance with the teachings of the embodiments described throughout this disclosure, the base station receives user data from the UE. In an optional second step 1420, the base station initiates transmission of the received user data to the host computer. In a third step 1430, the host computer receives the user data carried in the transmission initiated by the base station.

The disclosure has been described above with reference to embodiments thereof. It should be understood that various modifications, alternations and additions can be made by those skilled in the art without departing from the spirits and scope of the disclosure. Therefore, the scope of the disclosure is not limited to the above particular embodiments but only defined by the claims as attached.

The invention claimed is:

1. A method in a network device for configuration of Physical Downlink Control Channel, PDCCH, monitoring by a terminal device, the method comprising:
   determining a PDCCH monitoring configuration indicating a PDCCH resource pool to be monitored by the terminal device at an aggregation level, the PDCCH monitoring configuration determined based on a received signal power at one of the terminal device and the network device and at least one of:
      when the received signal power is lower than a first threshold power, a PDCCH resource pool for an aggregation level lower than a third threshold level is null; and
      when the received signal power is higher than a second threshold power, a PDCCH resource pool for an aggregation level higher than a fourth threshold level is null; and
   transmitting the PDCCH monitoring configuration to the terminal device.

2. The method of claim 1, wherein the terminal device is configured with a PDCCH search space and the PDCCH resource pool for the aggregation level comprises less than all Control Channel Elements, CCEs, in the PDCCH search space.

3. The method of claim 2, wherein the aggregation level is lower than or equal to a first threshold level.

4. The method of claim 3, wherein the PDCCH monitoring configuration further indicates a PDCCH resource pool for an aggregation level higher than the first threshold level that comprises all CCEs in the PDCCH search space.

5. The method of claim 1, wherein the PDCCH search space comprises at least one of a common PDCCH search space and a dedicated PDCCH search space.

6. The method of claim 1, further comprising:
   transmitting an instruction to enable or disable the PDCCH monitoring configuration to the terminal device via one of a Medium Access Control, MAC, Control Element, CE, and a PDCCH order.

7. A network device configured for configuration of Physical Downlink Control Channel, PDCCH, monitoring by a terminal device, the network device comprising a transceiver, a processor and a memory, the memory comprising instructions executable by the processor whereby the network device is configured to:
   determine a PDCCH monitoring configuration indicating a PDCCH resource pool to be monitored by the terminal device at an aggregation level, the PDCCH monitoring configuration determined based on a received signal power at one of the terminal device and the network device and at least one of:
      when the received signal power is lower than a first threshold power, a PDCCH resource pool for an aggregation level lower than a third threshold level is null; and
      when the received signal power is higher than a second threshold power, a PDCCH resource pool for an aggregation level higher than a fourth threshold level is null; and
   transmit the PDCCH monitoring configuration to the terminal device.

8. A method in a terminal device for Physical Downlink Control Channel, PDCCH, monitoring, comprising:

receiving from a network device a PDCCH monitoring configuration indicating a PDCCH resource pool to be monitored by the terminal device at an aggregation level; and monitoring a PDCCH from the network device in accordance with the PDCCH monitoring configuration;

the PDCCH monitoring configuration dependent on a received signal power at the terminal device or the network device and at least one of:

when the received signal power is lower than a first threshold power, a PDCCH resource pool for an aggregation level lower than a third threshold level is null; and when the received signal power is higher than a second threshold power, a PDCCH resource pool for an aggregation level higher than a fourth threshold level is null.

9. The method of claim 8, wherein the terminal device is configured with a PDCCH search space and the PDCCH resource pool for the aggregation level comprises less than all Control Channel Elements, CCEs, in the PDCCH search space.

10. The method of claim 9, wherein the aggregation level is lower than or equal to a first threshold level.

11. The method of claim 10, wherein the PDCCH monitoring configuration further indicates a PDCCH resource pool for an aggregation level higher than the first threshold level that comprises all CCEs in the PDCCH search space.

12. The method of claim 8, wherein the PDCCH search space comprises at least one of a common PDCCH search space and a dedicated PDCCH search space.

13. The method of claim 8, further comprising:

receiving an instruction to enable or disable the PDCCH monitoring configuration from the network device via one of a Medium Access Control, MAC, Control Element, CE, and a PDCCH order.

14. A terminal device configured for Physical Downlink Control Channel, PDCCH, monitoring, the terminal device comprising a transceiver, a processor and a memory, the memory comprising instructions executable by the processor whereby the terminal device is configured to:

receive from a network device a PDCCH monitoring configuration indicating a PDCCH resource pool to be monitored by the terminal device at an aggregation level; and monitor a PDCCH from the network device in accordance with the PDCCH monitoring configuration, the PDCCH monitoring configuration dependent on a received signal power at the terminal device or the network device and at least one of:

when the received signal power is lower than a first threshold power, a PDCCH resource pool for an aggregation level lower than a third threshold level is null; and when the received signal power is higher than a second threshold power, a PDCCH resource pool for an aggregation level higher than a fourth threshold level is null.

* * * * *